Patented Jan. 31, 1950

2,495,706

UNITED STATES PATENT OFFICE 2,495,706

VEGETABLE GEL

Letta I. De Voss and Arthur C. Beckel, Peoria, and Paul A. Belter, Pekin, Ill., assignors to the United States of America as represented by the Secretary of Agriculture No Drawing. Application October 29, 1947, Serial No. 782,941

7 Claims. (Cl. 99—17)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to vegetable gels, more particularly to vegetable gels derived from soybeans, and methods for their production.

An object of this invention is to provide a new composition of matter, in the form of a vegetable gel, arising from the proteinaceous content of soybeans.

Further objects are to provide food preparations containing the vegetable gel, and food compositions of the dry powder type containing the dried gelling constituents from which foods may be prepared simply and easily.

Another object of the invention is to provide a process by which the vegetable gel and the dried gelling constituents may be produced.

Other objects will be apparent from the description of the invention.

In general, the process of our invention involves providing an alcohol-extracted proteinaceous soybean residue which is substantially devoid of alcohol-soluble matter, extracting a sufficient quantity of this residue with water to obtain a mixture of a proteinaceous material dispersed in an aqueous solution of water-soluble constituents, this mixture containing at least about 5 percent proteinaceous material or at least about 10 percent solids. After removal of fibrous, insoluble soybean material, this mixture may be dried, as by spray-drying, to obtain a solid, powdery material. The mixture, or a similar water solution of the dried material, gels upon heating. The resulting product is an irreversible gel, and it, as well as compositions comprising a substantial portion of it, retains its shape indefinitely at all temperatures to which food products are normally exposed.

The above-mentioned residue can be procured in either of two ways. The first method is to treat a proteinaceous soybean material, which may be either flakes, ground soybeans, or soybeans broken or comminuted in any other fashion, to remove the oil. This may be done by conventional procedures, such as by extraction with petroleum ether, hexane, or other similar solvent, by mechanical expulsion of the oil, and so forth. The resulting oil-free, proteinaceous soybean material is then thoroughly contacted with alcohol, such as by washing, to extract alcohol-soluble matter.

We have found that washing with alcohol gives satisfactory results when the alcohol is employed in a concentration of about from 50 percent to absolute alcohol. We prefer to wash with about 70 percent alcohol and attain improved results by repeating the wash.

The second method involves treating the soybean material, in any of the forms mentioned above, with alcohol directly to extract the oil and any other alcohol-soluble matter present. Thus a secondary washing with alcohol is unnecessary.

In both the above procedures, the use of alcohol, preferably ethyl alcohol, has the effect of removing certain constituents among which are those which act as antigelling factors and which heretofore have prevented the formation of gels from proteinaceous soybean material.

An ideal material from which to obtain the gelling product is alcohol flakes, that is, flakes from which the oil has been extracted by ethyl alcohol. Other flakes may be used, however, such as hexane-extracted flakes, flakes from which the oil has been expelled mechanically, and the like. It is necessary in every case to remove the antigelling factors by means of an alcohol wash. In the case of alcohol flakes, however, a secondary wash is not necessary since these factors have been removed along with the oil. High temperatures should be avoided during processing for removal of the oil from the flakes.

In carrying out the process, the alcohol-extracted soybean residue prepared as described above, is mixed with water to obtain an aqueous solution containing at least about 10 percent solids, that is, at least about 5 percent proteinaceous matter, and is allowed to stand for a period of about one-half to one hour. Thereafter the insoluble, fibrous material is separated from the aqueous phase by conventional procedure, such as filtration or other suitable methods.

The remaining aqueous phase which contains at least about 10 percent solids may be evaporated, if desired, by conventional means, preferably by spray-drying, to produce the dry, solid, powdery gelling material. The aqueous phase itself, if it contains at least 10 percent solids, or a similar water solution of the dried product, will form the gel upon being heated. For the purposes of this specification and claims the term "solution," when referring to this aqueous phase or similar aqueous systems, is intended to mean that physical system in which a protein is contained in an aqueous medium in a solution-like state. It is familiar to those skilled in the art and is variously referred to in technical writings as a solution, dispersion, and so forth.

In general, the content of solids ranges from about 10 to 50 percent with respect to the water content, and the gelling temperatures range from 150° F. to boiling, the higher temperatures corresponding to the lower ranges of solids content.

The pH may vary over a wide range, but too great acidity will prevent gelling and induce precipitation of the proteinaceous constituents. In general, the pH should be kept within the range of about from 5.0 to 9.0.

The concentration of solids should be at least about 10 percent and preferably above that in order to insure a satisfactory gel. This corresponds to about 5 percent protein, since the protein content of the solids varies from 50 to 60 percent. Higher concentration may be used as desired.

The following tabulated example illustrates the gelling properties of various concentrations of spray-dried solids added to water. In these data the material used was obtained by water extration of alcohol flakes and contained about 54 percent protein. The pH of the aqueous solution was 6.0.

| Concentration | Gelling Properties |
|---|---|
| 1 percent solids added to water | Did not gel or precipitate. |
| 2.5 percent solids added to water | Do. |
| 5.0 percent solids added to water | Close to gel, but solution evaporated ½ volume. |
| 10.0 percent solids added to water | Gel on boiling. |
| 20.0 percent solids added to water | Gel at 200° F. |
| 40.0 percent solids added to water | Gel at 180° F. |

In general, the gels are all irreversible, strong, and capable of accommodating a great variety of additional materials. They are extremely advantageous in the preparation of foods. For instance, a wide variety of desserts or other foods made by incorporating flavors, fruits, fruit juices, nuts, syrups, and the like. The gels will accommodate most fruits but the extremely acid fruits or fruit juices tend to effect the gel by partial precipitation of the protein.

Meats and other proteinaceous material may be incorporated in the gel along with condiments, spices, and the like, if desired. The product results in an excellent meat loaf, sandwich filling, cold meat, and the like.

Other food preparations may be made, such as puddings, custards, cake icings, salads, or desserts by incorporation of the appropriate ingredients.

We have discovered that excellent quality frozen desserts may be made with the gels of this invention. Flavorings may be added to the gel in any desired manner and amount. The products have a texture similar to ice-cream and in many aspects are superior to ice-cream, since they do not lose their shape upon standing at room temperature for a prolonged time. The frozen desserts make excellent non-fattening food products, since it is not necessary to incorporate milk or milk products. It is to be understood, nevertheless, that milk, cream, sugar, and the like, may be added as desired.

The spray-dried material when used as a constituent with water, flour, starch, shortening, and the like, makes possible a series of bakery products. During the baking process, the gel forms and is stable at such temperatures. Cookies, crackers, biscuits, and the like, may be made in this manner.

The compositions comprising the vegetable gel may be made in several ways. The aqueous extract, after adding the desired ingredients such as flavorings, food material, coloring, etc., may be heated directly to form the gel. The dried solids may be added to aqueous medium containing the desired ingredients in an amount equal to at least 10 percent of the water content. Furthermore, the dried solids may be admixed with the dry or solid ingredients and water added to the mixture at any later time. The ingredients may also be incorporated after formation of the gel.

It is not to be inferred that all these food ingredients are used indiscriminately in any one preparation. One skilled in the culinary art would select those substances required by a given food preparation, and obviously would not be limited to the materials we have listed.

As pointed out above, this invention deals with the vegetable gel, including the gel itself, the aqueous solution of at least 10 percent solids, and the dried solids obtained from the aqueous extract of the flakes as described, to any one of which may be added a variety of other ingredients. Due to the irreversibility of the gels, they, as well as the food products containing them as constituents, are stable in physical form upon standing for prolonged periods, have advantageous qualities in preparing and serving, and in general, provide a new type of food product.

Having thus described our invention, what we claim is:

1. A process comprising extracting a sufficient quantity of an ethanol-extracted proteinaceous soybean residue with water to obtain an aqueous solution containing at least 5 percent proteinaceous material.

2. A process comprising extracting a sufficient quantity of an ethanol-extracted proteinaceous soybean residue with water to obtain an aqueous solution containing at least 5 percent proteinaceous material, and heating the solution to a temperature of about from 150° F. to boiling to form a gel.

3. A process comprising extracting a sufficient quantity of an ethanol-extracted proteinaceous soybean residue with water to obtain an aqueous solution containing at least 5 percent proteinaceous material, and evaporating the water to produce a dry product.

4. A process comprising mixing the dry product produced by the process of claim 3 with water to form an aqueous solution containing at least 5 percent proteinaceous material, and heating the solution to a temperature of about from 150° F. to boiling to form a gel.

5. A food composition comprising the gel produced by the process of claim 4.

6. A food composition comprising the gel produced by the process of claim 2.

7. The dry product produced by the process of claim 3.

LETTA I. DE VOSS.
ARTHUR C. BECKEL.
PAUL A. BELTER.

REFERENCES CITED

The following references are of record in the file of this patent:

UNITED STATES PATENTS

| Number | Name | Date |
|---|---|---|
| 2,238,329 | Julian et al. | Apr. 15, 1941 |

FOREIGN PATENTS

| Number | Country | Date |
|---|---|---|
| 333,959 | Great Britain | Aug. 28, 1930 |
| 361,956 | Great Britain | Nov. 25, 1931 |

OTHER REFERENCES

"A study of Protein Extract from Soybeans," J. Agri. Research, vol. 57, No. 10, Nov. 15, 1938, pages 737–746.